Figure 1:
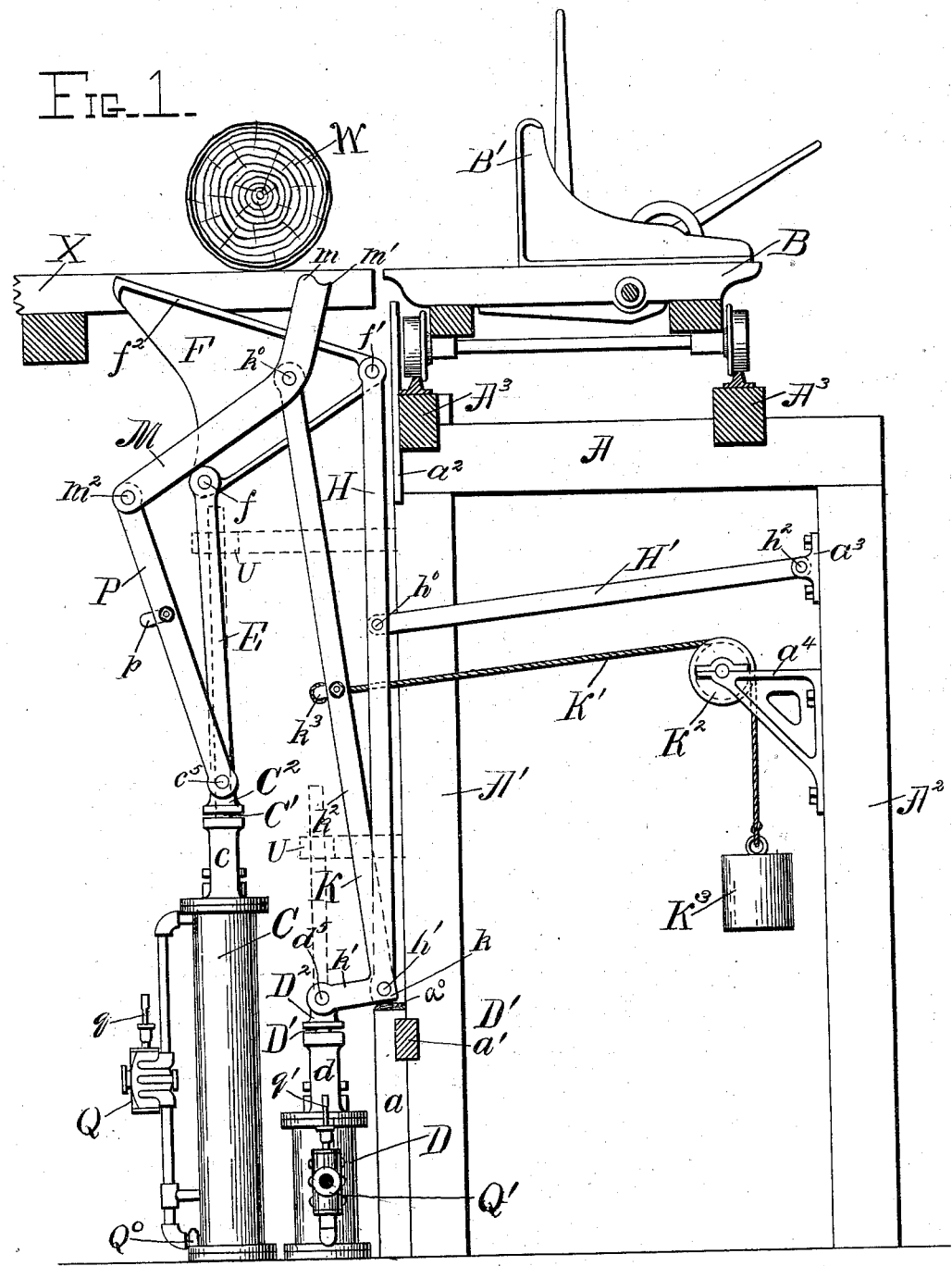

(No Model.) 6 Sheets—Sheet 1.
P. McNERNEY.
STEAM LOG LOADER AND TURNER.

No. 559,192. Patented Apr. 28, 1896.

Witnesses
Percy C. Bowen
John C. Wilson

Inventor
Peter McNerney,
by Whitman & Wilkinson,
Attorneys

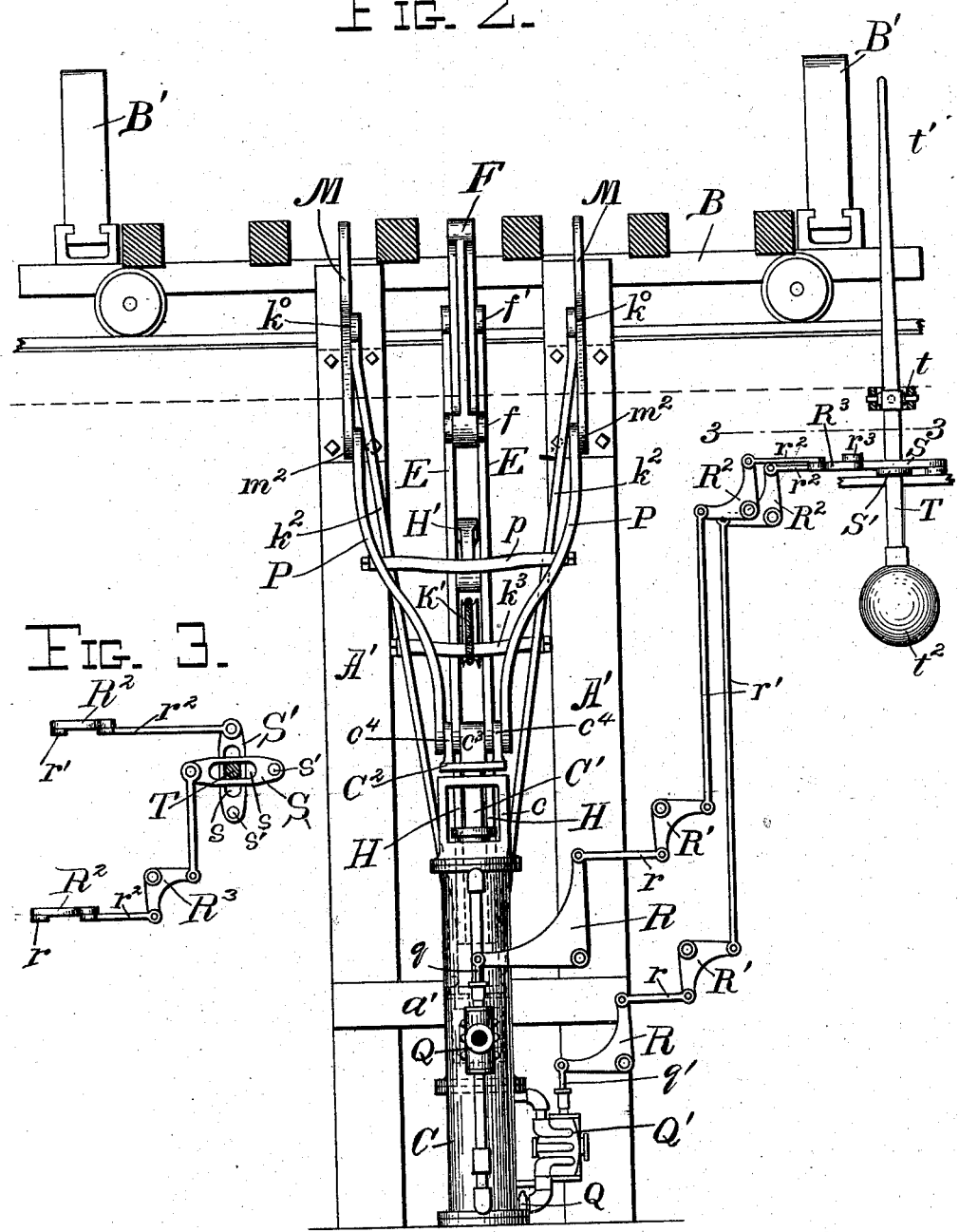

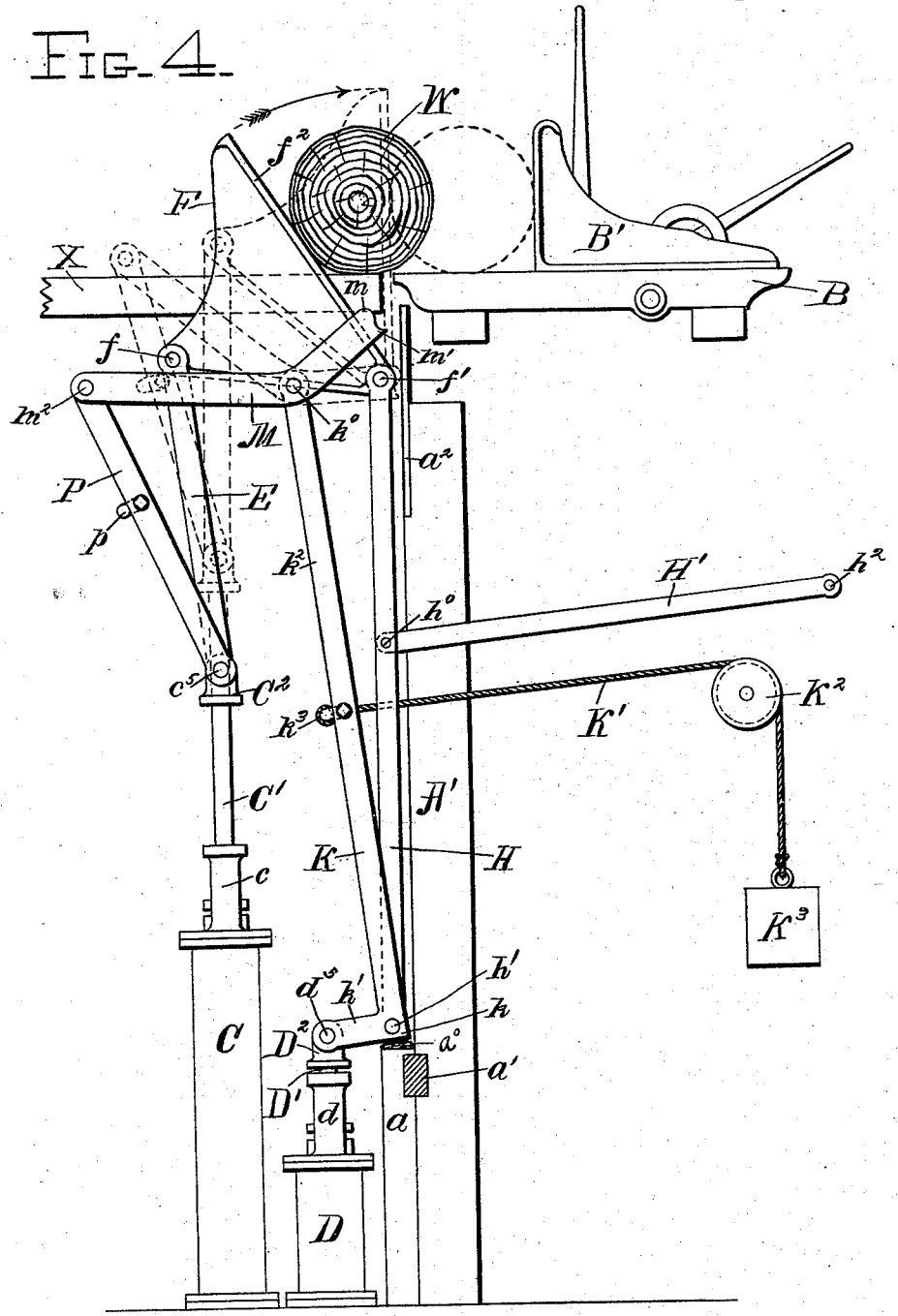

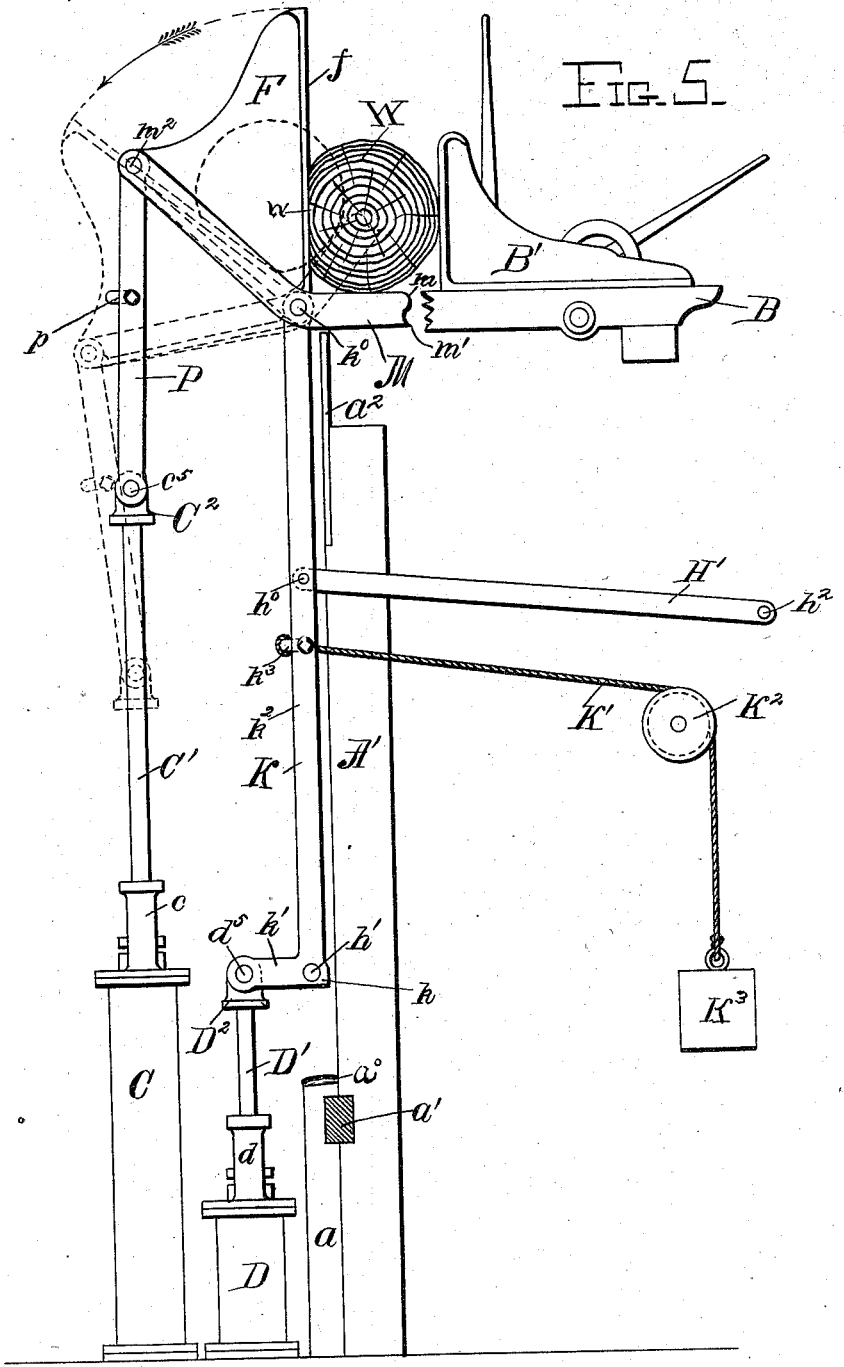

(No Model.)  6 Sheets—Sheet 5.

P. McNERNEY.
STEAM LOG LOADER AND TURNER.

No. 559,192. Patented Apr. 28, 1896.

Witnesses
Percy C. Bowen
John C. Wilson

Inventor
Peter McNerney,
by Whitman & Wilkinson
Attorneys.

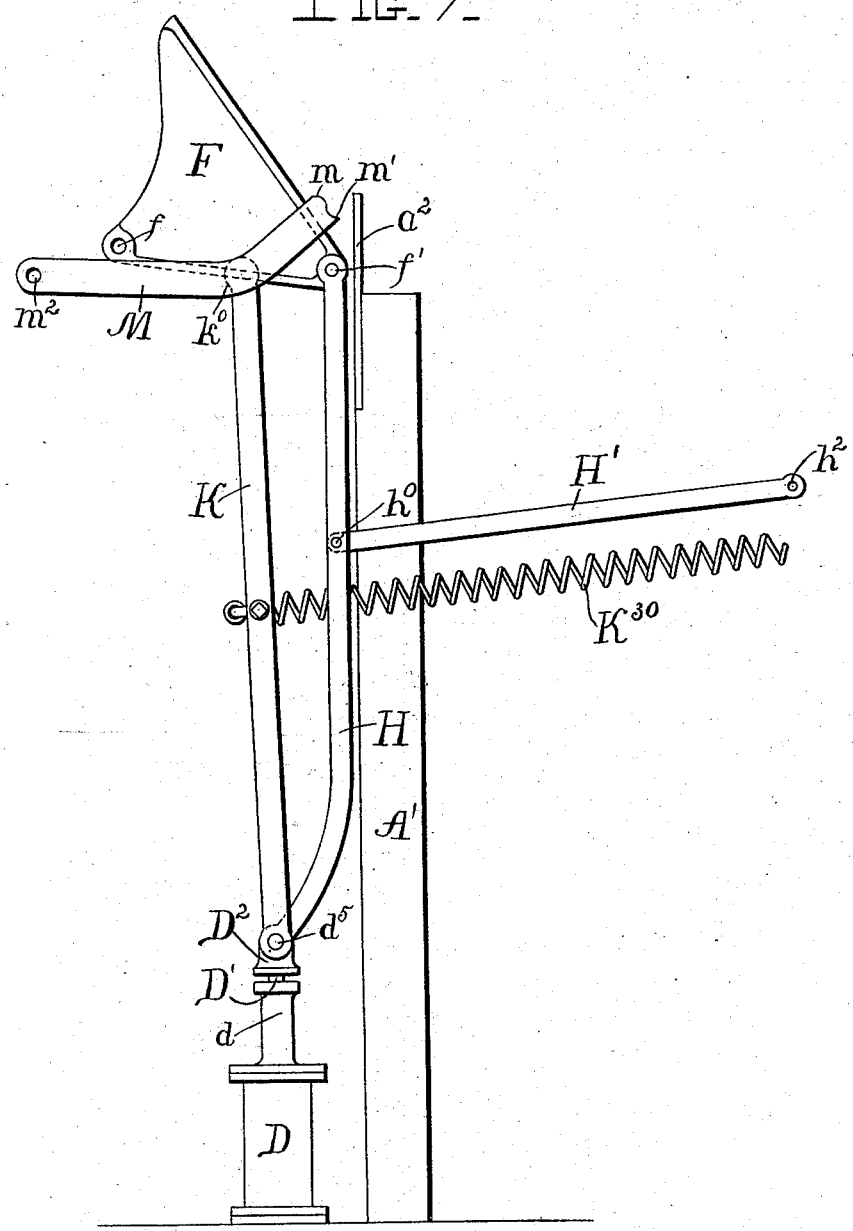

UNITED STATES PATENT OFFICE,

PETER McNERNEY, OF MARINETTE, WISCONSIN.

STEAM LOG LOADER AND TURNER.

SPECIFICATION forming part of Letters Patent No. 559,192, dated April 28, 1896.

Application filed November 6, 1895. Serial No. 568,101. (No model.)

*To all whom it may concern:*

Be it known that I, PETER McNERNEY, a citizen of the United States, residing at Marinette, in the county of Marinette and State of Wisconsin, have invented certain new and useful Improvements in Steam Log Loaders and Turners; and I do hereby declare the following to be a full, clear, and exact description of the invention, such as will enable others skilled in the art to which it appertains to make and use the same.

My invention relates to improvements in apparatus for loading and turning logs or cants on a sawmill-carriage by mechanical means.

According to this invention the log or cant is moved by a plurality of movable arms coming either separately or together into direct contact with one or more of the sides of the log or cant, whereby the log may be shoved laterally or "loaded," as it is generally termed, or the same may be lifted bodily or may be turned about its axis through any desired angle. The motive power used is preferably fluid-pressure, such as steam; but any suitable power may be adopted. Moreover, the mechanism for transmitting the required motion to the arms may be varied in many ways.

One means of carrying out the said invention is shown in the drawings, to which reference is now had.

Figure 6:
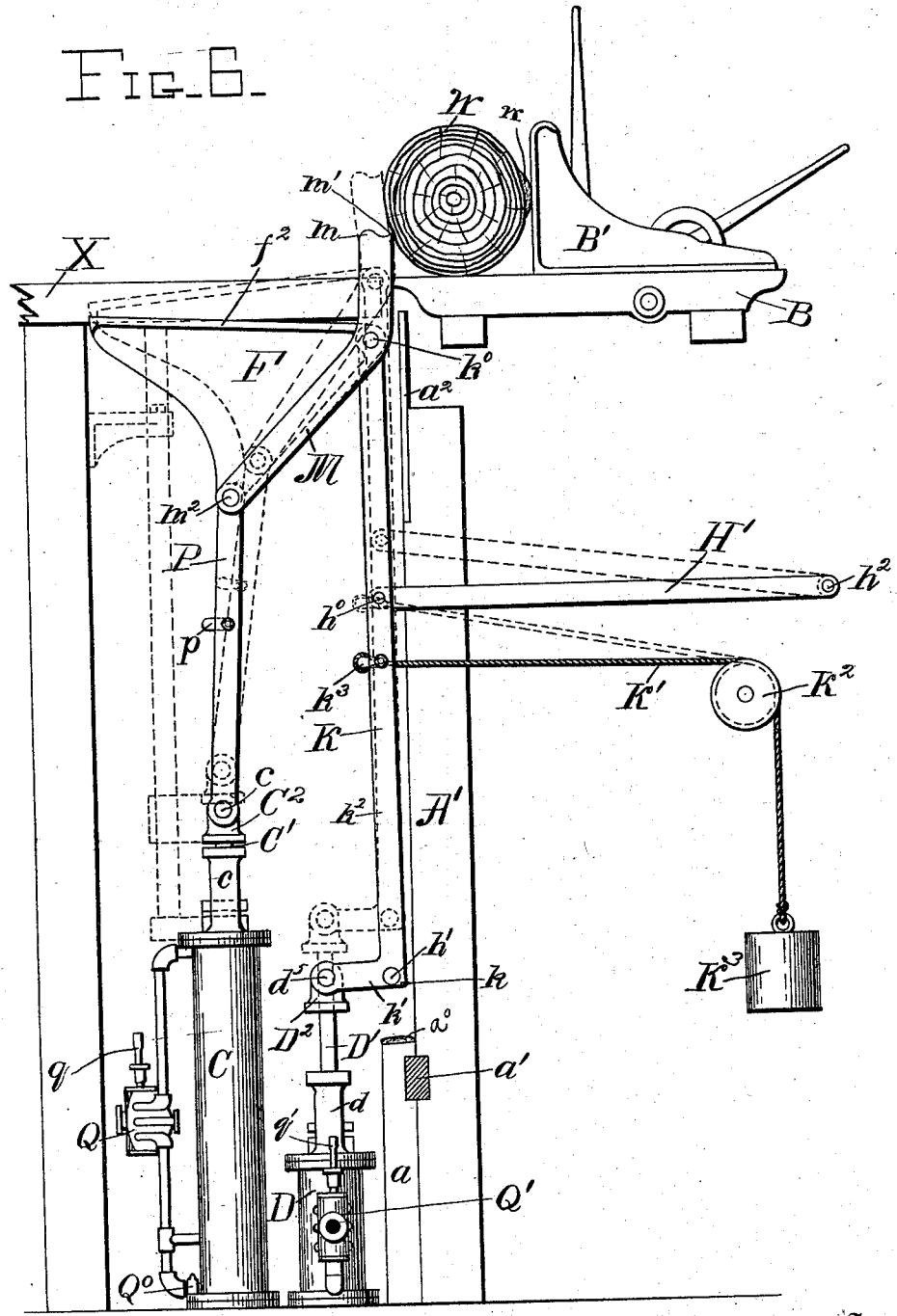

Figure 1 represents a cross-section through a sawmill-carriage and the log-deck and shows the apparatus in elevation out of operation or in the initial position. Fig. 2 represents an end view of the apparatus as seen from the left of Fig. 1. Fig. 3 represents a detail plan view of the lever connections for operating the valves of the fluid-pressure cylinders. Fig. 4 is a diagrammatic view showing the operation of the apparatus in loading a log onto the sawmill-carriage. Fig. 5 represents a diagrammatic view of the apparatus in the operation of turning down a log that has been slabbed on one side for the purpose of presenting a fresh side to the saw; and Fig. 6 represents, diagrammatically, the manner in which the log is turned through a small angle about its axis in order to get a knot clear of the knees or head-blocks or to adjust a log so that any imperfections therein may be properly presented to the saw-line, or for other purposes; and Fig. 7 represents a modification in which the vertical support for the pivots is connected directly to the piston-rod instead of through a bent arm and the swinging motion to the canting-arm is given by means of a spring.

The same parts are indicated by the same letters throughout the several views.

A represents the platform on which the timbers $A^3$ are supported, which timbers carry the tracks on which the sawmill-carriage B runs. This sawmill-carriage is provided with the knees B', and the entire carriage is constructed in the ordinary or in any well-known way.

The platform A is partly supported on the uprights A' and $A^2$, between which uprights A' is or may be secured a cross-piece $a'$, let into the timber or other support $a$. Near their upper ends these uprights A' are faced with stout metal plates $a^2$.

C represents a long stationary cylinder, and D a short cylinder, also stationary, parallel to the first, and preferably placed in a vertical position. Each of these cylinders is provided with upwardly-projecting guides $c$ and $d$ for the piston-rods C' and D', which piston-rods carry cross-heads $C^2$ and $D^2$, provided with transverse pins $c^5$ and $d^5$. The piston-rods C' and D' may also be provided with suitable guides to insure their working in perfect line with their respective cylinders, as indicated in dotted lines at U in Fig. 6. The cross-head $C^2$ is provided with a central tongue $c^3$ or continuation of the piston-rod and two side tongues $c^4$, spaced at a short distance therefrom, between which tongues $c^3$ and $c^4$ are pivoted the ends of the two side bars E, which are pivotally connected, as at $f$, to the lower outer end of the loading-arm F. This loading-arm is represented in the form of an approximately triangular plate having ribbed or flanged edges, such as $f^2$; but this plate may be made in the form of a bent bar or bell-crank lever, constructed of any suitable material, if desired, although I prefer to have the said loading-arm in the form of a plate, in order to get the great rigidity and strength found in a deep plate, such as is shown. While I have shown two of these side bars E pivoted to the opposite sides of the plate F, a single forked bar may be used, if desired;

but in order to balance the strains I preferably use two bars, as shown.

At the forward corner of the loading arm or plate F the two vertical bars H are pivotally attached, as at $f'$, while the lower ends of these bars are connected by means of the pin $h'$ to the bosses $k$ of the bent levers K. Instead of two of these bars H, one on either side of the loading-arm F, a single forked bar may be used, if desired. The bar or bars H have pivotally connected thereto, as at $h^0$, the radius-bar H', which is pivoted at $h^2$ to the bracket $a^3$, which bracket is secured to any convenient post, as $A^2$. These bars H are held always in an approximately-vertical direction by the said radius-bar H', the slight lateral motion of the said bars H, due to the the circular motion of the radius-bar, being immaterial and unobjectionable. Instead of the radius-bar, the bar or bars H may be arranged to move in vertical guides, if desired.

The angular levers K are provided with short arms $k'$ and long arms $k^2$, which are approximately at right angles to each other, and both turn about the pivot $h'$. The short arms $k'$ are pivotally connected to the pin $d^5$ on the cross-head $D^2$, and the longer arms are pivotally connected, as at $k^0$, to the two canting-arms M. These arms $k^2$ are inclined outward, as shown at Fig. 2, and the canting-arms M are spaced at some distance on either side of the loading-arm F, to enable them to operate between the head-blocks or each side of any one of them on the sawmill-carriage, and also to give sufficient distance between the supports when the log is lifted, as will be hereinafter described. These arms $k^2$ are connected by the bent brace $k^3$ and a rope K', passing over a pulley $K^2$ and supporting a weight $K^3$, as shown at $K^{30}$ in Fig. 7, or its equivalent spring may be used to swing the bar K to the right for quickly throwing the canting-arms beneath the saw-log, as will be hereinafter described. A timber-support $a$ or other suitable stop, preferably faced with rubber or leather $a^0$, is placed in the proper position to check the downward movement of the pivot $h'$, for the purpose of keeping the arms $k^2$ inclined backward slightly when the piston-rod D' is at its lowest position.

In the form of device shown in Fig. 7 the bar K is made straight, and together with the bar H it is pivoted directly to the end of the piston-rod D', the swinging motion of the canting-arm being secured by the spring $K^{30}$, which is the equivalent of the weight $K^3$, already described.

The canting-arms M are bent, as shown, and have their forward ends terminating in the rounded portion $m$, projecting somewhat beyond the biting edge $m'$, to prevent the canting-arms from gouging into the bottom face of the log or cant, or from being dulled by or cutting into the plates $a^2$, as will be hereinafter described, while the rear ends of the said canting-arms are pivoted at $m^2$ to the bent bars P, which are connected together by the bent brace $p$, and at their lower ends are pivoted on the pins $c^5$ of the cross-head $C^2$. The free ends of the canting-arms M are preferably so adjusted as to be always at approximately right angles to the loading edge $f^2$ of the loading-arm F.

The cylinders C and D are adapted to cushion at the lower end of the stroke by inwardly-acting check-valves placed at $Q^0$, (see Figs. 1 and 2,) and are supplied with valves Q and Q', which are provided with valve-stems $q$ and $q'$, connected by the system of bell-crank levers R, R', $R^2$, and $R^3$ and the connecting-rods $r$, $r'$, $r^2$, and $r^3$ with the levers S and S', which are slotted, as at $s$, and pivoted, as at $s'$. The said levers S and S' are set at approximately right angles to each other, as shown in Fig. 3, and are operated by the hand-rod T, which is suspended on a universal joint $t$, and is provided with a handle $t'$ and with a weight $t^2$. By this system of levers and by an arrangement of valves well known in the art steam or other fluid pressure may be admitted to either end of either cylinder or to one end of one cylinder and the opposite end of the other, or vice versa, and thus the motions of the pistons in the two cylinders may be regulated at will by the operator at the handle $t'$.

X represents the log-deck upon which the logs W are placed ready for loading onto the sawmill-carriage.

The operation of the device will now be described in detail.

Since the pistons in the cylinders C and D may be forced up or down or held up or held down by means of admitting fluid-pressure into the proper end of the cylinder, in describing the operation of the apparatus it will be more convenient to refer merely to the motion of the piston-rods, it being understood that this motion is produced in the ordinary well-known way. The various parts being in the initial position, with the log rolled near the edge of the log-deck, as shown in Fig. 1, the piston-rod C' is forced upward and the piston-rod D' is held down in the lower position, with the pivot $h'$ resting on the timber or other support $a$, the parts coming quickly to the position shown in full lines in Fig. 4. The further upward motion of the piston-rod C' will force the loading-arm F around about its pivot $f'$, which pivot will be held fast by the radius-bar H' and the piston-rod D', and the loading-arm will shove or roll the log toward the carriage. At the same time the nose of the canting-arms M will be lowered downward toward the plates $a^2$ until when the various parts reach the position shown in dotted lines in Fig. 4 the nose of the canting-arms will bear against the said plate $a^2$ and the log will be forced by the loading-arm against the face of the knees B', all as shown in Fig. 4. Thus it will be seen that the canting-arms do not assist in the loading proper. The log after being loaded onto the sawmill-carriage is secured in place in the usual way and a slab is sawed off, as shown at $w$ in Fig. 5. In the meantime the loading and turning apparatus are brought back to the initial position shown in Fig. 1. Now after one side of the log has been slabbed and it is desired to work on the next face of the log the apparatus is brought to the position shown in the dotted lines in Fig. 4, as has already been described, and then the pistons $C'$ and $D'$ are both forced upward to the position shown in Fig. 5. The upward motion of the arms $k^2$ will shove the nose of the canting-arms clear of the plates $a^3$, when the motion of the short arms $k'$ about the pivot $h'$ will swing the end of the canting-arms rapidly between the head-blocks of the sawmill-carriage and beneath the sawlog to the position shown in Fig. 5. This rotary motion of the arms $k^2$ about the pivot $h'$ will be accelerated by the weight $K^3$ or its equivalent spring; but neither the weight nor the spring may be used, if preferred, since the upward travel of the piston-rod $D'$ will tend to swing the short arms $k'$ and also the long arms $k^2$ about the pivot $h'$, and the longer radius of the latter will cause a very little travel of the short arms to swing the free end of the long arms and the canting-levers carried thereby through the required distance laterally. When the parts are in the position shown in full lines in Fig. 5, keep the pressure on the piston-rod $D'$ and pull down on the piston-rod $C'$, when the log will be lifted up bodily to the position shown in dotted lines in Fig. 5, and by further lowering the loading-arm F the log may be laid on its slabbed side on the log-deck in approximately the position occupied by the log in Fig. 1, when by lowering the piston-rod $D'$ the apparatus will return to the initial position, and the log may be shoved on the timber-carriage in the manner already described by reference to Fig. 4. In a similar way a log with two sides slabbed may be turned over to have its third side slabbed, and so on until all four of the sides of the log are slabbed; or a cant placed on the sawmill-carriage may be turned over approximately ninety degrees at a time until it is revolved through ninety degrees, one hundred and eighty degrees, two hundred and seventy degrees, three hundred and sixty degrees, &c.; but it will rarely be necessary to turn the log more than ninety degrees for a fresh cut, which can be done in one operation.

It frequently becomes necessary or desirable to turn a log through a small angle on the carriage to clear a knot from the knee or from the head-blocks or to avoid an imperfection in the log or for other reasons, and this may be done in the manner shown in Fig. 6, where the log being in place on the sawmill-carriage and the apparatus being in the position shown in Fig. 1 the piston-rod $D'$ is pushed upward until the biting edge $m'$ catches in the log, as shown in Fig. 6. Then keep pushing upward on the piston-rod $D'$ until the canting-arm reaches the position shown in dotted lines, when it will disengage itself from the log owing to the round shape of the latter. If by this operation the knot $w'$ is not removed clear of the knee $B'$, the canting-arm may be drawn down again and then forced up a second time, again biting in the log and turning the same over through a small angle. In this manner a round log may be revolved through any desired angle without removing the same from the sawmill-carriage. By this method of turning the log toward the knees the bark or rough surface of the log only is engaged, and in a positive manner obviating most of the injuries due to the sharp teeth now most commonly used for this purpose.

It will be seen that this apparatus turns the log either toward or away from the knees, as may be desired. Moreover, the loading-arm operates on the log with a rapidly-decreasing motion, whereby the motion of the log slows down rapidly as it approaches the knees, while at the same time the power-arm increases, thus rendering it possible to stop the loading-arm entirely and then easily slide the log against the knees, thus avoiding accidents to the set works.

While I have shown steam-cylinders for operating the canting-arms and the loading-arm it will be obvious that any other suitable means of imparting reciprocating motion may be adopted. Moreover, it will be obvious that only one of the canting-arms may be used and two loading-arms or only a single canting-arm and a single loading-arm, or where extremely long and heavy logs are to be handled the apparatus may be duplicated at each end of the log-deck.

The herein-described mode of manipulating logs for the purposes set forth is believed to be broadly new, and it is my purpose to claim all equivalent means of accomplishing the same result in a substantially similar way.

The invention is believed to be a pioneer invention and is broadly claimed as such.

Having thus described my invention, what I claim, and desire to secure by Letters Patent of the United States, is—

1. In an apparatus for turning logs on sawmill-carriages, a canting-arm pivoted mediate of its length, means for swinging the free end of said arm horizontally beneath the log on the carriage, for tilting said free end about said pivot to a vertical position, and for substantially vertically reciprocating said free end while in its vertical position and in engagement with the log, substantially as described.

2. An apparatus for loading and turning logs on sawmill-carriages comprising a loading-arm with a vertically-movable pivot therefor, and a canting-arm provided with a vertically and a laterally movable pivot, with means for moving the pivot of said loading-arm vertically and for swinging the said arm about its pivot, and means for raising and lowering the pivot of said canting-arm, for giving said pivot a distinct substantial lateral movement, and for swinging the said canting-arm about said pivot, substantially as described.

3. In an apparatus for loading and turning logs on sawmill-carriages, the combination with a pivoted loading-arm and means for swinging the same about its pivot, of means for moving said pivot vertically, and a canting-arm with means for moving the same perpendicularly relative to said loading-arm and for holding said canting-arm at the desired angle relative to said loading-arm while the latter is swung about its pivot, substantially as described.

4. In an apparatus for turning logs on sawmill-carriages, a pivoted canting-arm and means for moving said arm into a substantially horizontal position and engaging the bottom of the log on the carriage, for tilting said arm on an axis substantially in the saw-line to cant the log and for reciprocating said arm substantially in the plane of the saw to rotate the log on its axis, substantially as described.

5. An apparatus for loading and turning logs on sawmill-carriages comprising a loading-arm with a vertically-movable pivot therefor, and a plurality of canting-arms provided with vertically and laterally movable pivots, with means for moving the pivot of said loading-arm vertically and for swinging the said arm about its pivot, and means for raising and lowering the pivots of said canting-arms, for giving said pivots a substantial lateral movement, and for swinging the said canting-arms about said pivots, substantially as described.

6. In an apparatus for loading and turning logs on sawmill-carriages, the combination with a pivoted loading-arm and means for swinging the same about its pivot, of means for moving said pivot vertically, and a plurality of canting-arms with means for moving the same perpendicularly relative to said loading-arm and for holding said canting-arms at the desired angle relative to said loading-arm while the latter is swung about its pivot, substantially as described.

7. An apparatus for loading and turning logs on sawmill-carriages, comprising a pivoted loading-arm adapted to press the logs toward the sawmill-carriage, and a pivoted canting-arm moving at right angles relative to said loading-arm and adapted to move horizontally beneath the log on the carriage, with common means for raising and lowering the pivots of both of said arms and for swinging said arms about their pivots, substantially as described.

8. An apparatus for loading and turning logs on sawmill-carriages, comprising a pivoted loading-arm adapted to press the logs toward the sawmill-carriage, and a plurality of pivoted canting-arms moving at right angles relative to said loading-arm and adapted to move horizontally beneath the log on the carriage, with common means for raising and lowering the pivots of said arms and for swinging said arms about their pivots, substantially as described.

9. An apparatus for loading and turning logs on sawmill-carriages comprising a loading-arm with a vertically-movable pivot therefor, and a canting-arm provided with a vertically and a laterally movable pivot and normally movable at approximately right angles to the face of said loading-arm, with means for moving the pivot of said loading-arm vertically and for swinging the said arm about its pivot, and means for raising and lowering the pivot of said canting-arm, for giving said pivot a distinct substantial lateral movement, and for swinging the said canting-arm about said pivot, substantially as described.

10. An apparatus for loading and turning logs on sawmill-carriages comprising a loading-arm with a vertically-movable pivot therefor, and a plurality of canting-arms each provided with a vertically and a laterally movable pivot and normally movable at approximately right angles to the face of said loading-arm, with means for moving the pivot of said loading-arm vertically and for swinging the said arm about its pivot, and means for raising and lowering the pivots of said canting-arms, for giving said arms a distinct and substantial lateral movement and for swinging the said canting-arms about said pivots, substantially as described.

11. In an apparatus for loading and turning logs on sawmill-carriages, the combination with a pivoted loading-arm and means for swinging the same about its pivot, of means for moving said pivot vertically, and a canting-arm normally moving at right angles to the face of said loading-arm, with means for moving the same perpendicularly relative to said loading-arm and for holding said canting-arm at the desired angle relative to said loading-arm while the latter is swung about its pivot, substantially as described.

12. In an apparatus for loading and turning logs on sawmill-carriages, the combination with a pivoted loading-arm and means for swinging the same about its pivot, of means for moving said pivot vertically, and a plurality of canting-arms normally moving at right angles to the face of said loading-arm, with means for moving the same perpendicularly relative to said loading-arm and for holding said canting-arms at the desired angle relative to said loading-arm while the latter is swung about its pivot, substantially as described.

13. In an apparatus for turning logs on sawmill-carriages, the combination with a canting-arm pivotally connected to the actuating means, of means for horizontally moving said arm beneath the log on the carriage, for moving vertically the pivot of said arm and for swinging said arm about said pivot, substantially as described.

14. In an apparatus for turning logs on sawmill-carriages, the combination with a pivoted canting-arm bent at or near its pivot and provided with a rounded face and a biting edge at the free end thereof, the said rounded face projecting somewhat beyond the said biting edge on the end face of the canting-arm with means for swinging said free end beneath the log, and means for moving said pivot vertically and for swinging said arm about said pivot, substantially as described.

15. In an apparatus for turning logs on sawmill-carriages, the combination with a canting-arm bent as shown and provided with a vertically-movable pivot, of means for moving said pivot vertically and for imparting thereto a distinct and substantial lateral movement, and means for swinging said arm about said pivot, substantially as described.

16. An apparatus for turning logs on sawmill-carriages comprising a canting-arm provided mediate of its length with a vertically and a laterally movable pivot, with means for raising and lowering the pivot of said canting-arm, for swinging said pivot laterally, with a distinct and substantial movement and for moving the said canting-arm about said pivot, substantially as described.

17. An apparatus for turning logs on sawmill-carriages comprising a plurality of canting-arms provided mediate of their length with vertically and laterally movable pivots, with means for raising and lowering the pivots of said canting-arms, for moving said pivots laterally with a distinct and substantial movement, and for swinging the said canting-arms about said pivots, substantially as described.

18. An apparatus for turning logs on sawmill-carriages comprising a plurality of bent canting-arms provided mediate of their length with vertically and laterally movable pivots, the free end of said arms being provided with biting edges, with means for raising and lowering the pivots of said canting-arms, for moving said pivots laterally with a distinct and substantial movement and for swinging the said canting-arms about said pivots substantially as described.

19. In an apparatus for turning logs on sawmill-carriages, the combination with a canting-arm, of an angular lever provided with two legs, and a vertically-movable pivot, the upper leg being pivotally connected to said canting-arm, of means operating on the opposite leg of said angular lever for raising the pivot thereof, vertically, and for swinging said angular lever about said pivot, and means for swinging said canting-arm about its pivot, substantially as described.

20. In an apparatus for turning logs on sawmill-carriages, the combination with a canting-arm, of a vertically-movable support for said canting-arm forming the pivot thereof, means pivotally connected thereto for moving said support vertically and for moving the same laterally with a distinct and substantial movement, and means for swinging the said canting-arm about said pivot, substantially as described.

21. In an apparatus for turning logs on sawmill-carriages, the combination with a plurality of canting-arms, of vertically-movable supports for said canting-arms, which supports form the pivots for said canting-arms, of means pivotally connected thereto for moving said supports vertically and for moving the same laterally with a distinct and substantial movement, and means for swinging said canting-arms about said pivots, substantially as described.

22. In an apparatus for turning logs on sawmill-carriages, the combination with a plurality of canting-arms, of a plurality of angular levers each provided with two legs and a vertically-movable pivot, the upper legs being pivotally connected to said canting-arms, of means for exerting an upward pressure on the lower legs, of said angular levers adapted to raise the pivot thereof vertically, and to swing said angular levers about said pivots and means for swinging said canting-arms about their pivots, substantially as described.

23. In an apparatus for turning logs on sawmill-carriages, the combination, of a canting-arm, a vertically-movable support for said canting-arm and forming the pivot thereof, means for moving said support vertically, means for moving the said support laterally with a distinct and substantial movement and means for preventing the canting-arm swinging beyond the saw-line until it is above the level of the carriage-timbers, substantially as described.

24. In an apparatus for turning logs on sawmill-carriages, the combination with a frame supporting the sawmill-carriage, and a plurality of plates fast to said frame, of a plurality of canting-arms, vertically-movable supports for said canting-arms and forming the pivots thereof, means for holding the face of said canting-arms against the said plates during a portion of the upward travel of said supports, and for swinging the said supports laterally when the free ends of said canting-arms pass above said plates, substantially as described.

25. In an apparatus for turning logs on sawmill-carriages, the combination with a frame supporting the sawmill-carriage, and a plate fast to said frame, of a canting-arm, an angular lever provided with two legs, and a vertically-movable pivot, the upper leg being pivotally connected to said canting-arm and forming the pivot thereof, of means for exerting an upward pressure on the lower leg of said angular lever, causing said canting-arm to bear against said plate during a portion of the upward travel of said angular lever, and to swing laterally above said plate when the free end of said canting-arm passes said plate, with means for swinging said canting-arm about its pivot, substantially as described.

26. In an apparatus for turning logs on sawmill-carriages, the combination with a frame supporting the sawmill-carriage, and a plate fast to said frame, of a canting-arm having a rounded face and a biting edge beneath the same, an angular lever provided with two legs, and a vertically-movable pivot, the upper leg being pivotally connected to said canting-arm and forming the pivot thereof, of means for exerting an upward pressure on the lower leg of said angular lever, causing the rounded face of said canting-arm to bear against said plate during a portion of the upward travel of said angular lever, and to swing laterally above said plate when the free end of said canting-arm passes said plate, with means for swinging said canting-arm about its pivot, substantially as described.

27. In an apparatus for turning logs on sawmill-carriages, the combination with a frame supporting the sawmill-carriage, and a plate fast to said frame, of a canting-arm, an angular lever provided with a long upper and a short lower leg and a vertically-movable pivot, the upper leg being pivotally connected to said canting-arm and forming the pivot thereof, of means for exerting an upward pressure on the short lower leg of said angular lever, causing said canting-arm to bear against said plate during a portion of the upward travel of said angular lever, and to swing rapidly laterally above said plate when the free end of said canting-arm passes said plate, and means for swinging said canting-arm about its pivot, substantially as described.

28. In an apparatus for turning logs on sawmill-carriages, the combination with a canting-arm, of an angular lever provided with one long and one short leg, and a vertically-movable pivot, the long leg being pivotally connected to said canting-arm, of means operating on the short leg of said angular lever for raising the pivot thereof vertically, and for swinging said angular lever about said pivot, and means for checking the motion of said angular lever about its pivot until said canting-arm has reached a predetermined height, substantially as described.

29. In an apparatus for turning logs on sawmill-carriages, the combination with a plurality of canting-arms, of a plurality of angular levers each provided with a long and a short leg, and a vertically-movable pivot, the long legs being pivotally connected to said canting-arms, of means for exerting an upward pressure on the short legs of said angular levers adapted to raise the pivots thereof vertically, and to swing said angular levers about said pivots, means for checking the motion of said angular levers about their pivots until said canting-arms have reached a predetermined height, and means for swinging said canting-arms about their pivots, substantially as described.

30. In an apparatus for turning logs on sawmill-carriages, the combination with a frame supporting the sawmill-carriage, and a plate fast to said frame, of a canting-arm, a vertical support therefor forming the pivot of said canting-arm, means for holding the face of said canting-arm against said plate during a portion of the upward travel of said support, and for swinging said support laterally when the fore end of said canting-arm passes above said plate, and means for swinging said canting-arm about its pivot, substantially as described.

31. In an apparatus of the character described, a log-engaging arm having two independently-movable supports, to each of which it is so connected as to move upon either as the other is independently moved, means for independently or simultaneously moving either support vertically and for giving the said supports substantial lateral movement, substantially as described.

32. In an apparatus of the character described, the combination of a log-engaging arm having two independently-movable supports, to each of which it is so connected as to move upon either as the other support is independently moved, means for independently or simultaneously moving either support vertically and for giving the said supports a distinct lateral movement, with a pivoted log-loading arm, and means for rotating said loading-arm about its pivot, substantially as described.

33. In an apparatus of the character described, the combination of a canting-arm having two independently-movable supports, to each of which it is so connected as to move upon either support as the other is independently moved, means for independently or simultaneously moving either support vertically and for giving said supports a distinct and substantial lateral movement, with a loading-arm provided with a vertical movable pivot, and means for swinging said loading-arm about said pivot, substantially as described.

34. In an apparatus of the character described, the combination with a canting-arm having two independently-movable supports, to each of which it is so connected as to move upon either support as the other is independently moved, means for independently or simultaneously moving either support vertically, and for giving said supports a distinct and substantial lateral movement, of a loading-arm provided with a vertically-movable pivot, with means for moving the same simultaneously with one of the movable supports for the canting-arm, and means for swinging said loading-arm about its pivot, substantially as described.

35. In an apparatus for loading logs on sawmill-carriages, the combination with a loading-arm, of an approximately vertical bar or bars forming a support pivotally connected to said loading-arm and forming the pivot thereof, a radius-bar pivotally connected to said supporting bar or bars at some distance from the piston-rod and holding the said bar or bars in an approximately vertical position, a stationary cylinder with piston-rod and connections for raising and lowering said support, and means for swinging said loading-arm about its pivot from its normal position in the log-deck to a position in the plane of the saw, substantially as described.

36. In an apparatus for loading logs on sawmill-carriages, the combination with a loading-arm, of an approximately vertical bar or bars forming a support pivotally connected to said loading-arm and forming the pivot thereof, a radius-bar pivotally connected to said supporting bar or bars at some distance from the piston-rod and holding said bar or bars in an approximately vertical position, a stationary cylinder with piston-rod and connections for raising and lowering said support, and a second cylinder with piston-rod and connections for swinging said loading-arm about its pivot from its normal position in the log-deck to a position in the plane of the saw, substantially as described.

37. An apparatus for loading and turning logs on sawmill-carriages comprising a loading-arm with a vertically-movable pivot therefor, and a canting-arm provided with a vertically and a laterally movable pivot and normally movable at approximately right angles to the face of said loading-arm, with means for moving the pivot of said loading-arm vertically and for swinging the said arm about its pivot in one direction, and means for simultaneously raising or lowering the pivots of said canting-arm and said loading-arm, means for swinging said canting-arm pivot laterally, and means for swinging the said canting-arm about said pivot in the opposite direction to the motion of said loading-arm, substantially as described.

38. In an apparatus for loading and turning logs on sawmill-carriages, the combination with a pivoted canting-arm bent at or near its pivot and provided with a rounded face and a biting edge at the free end thereof with means for swinging said free end beneath the log, means for moving said pivot vertically and for swinging said arm about said pivot, and a loading-arm with means for moving the same in a constant angular relation to said canting-arm, substantially as described.

39. In an apparatus for loading and turning logs on sawmill-carriages, the combination with a frame supporting the sawmill-carriage, and a plate fast to said frame, of a canting-arm, an angular lever provided with two legs, and a vertically-movable pivot, the upper leg being pivotally connected to said canting-arm and forming the pivot thereof, of means for exerting an upward pressure on the lower leg of said angular lever, causing said canting-arm to bear against said plate during a portion of the upward travel of said angular lever, and to swing laterally above said plate when the free end of said canting-arm passes said plate, with means for swinging said canting-arm about its pivot, a loading-arm provided with a vertically-movable pivot, and means for swinging said loading-arm about its pivot, substantially as described.

40. In an apparatus for loading and turning logs on sawmill-carriages, the combination with a frame supporting the sawmill-carriage, and a plate fast to said frame, of a canting-arm having a rounded face and a biting edge beneath the same, an angular lever provided with two legs, and a vertically-movable pivot, the upper leg being pivotally connected to said canting-arm and forming the pivot thereof, of means for exerting an upward pressure on the lower leg of said angular lever, causing the rounded face of said canting-arm to bear against said plate during a portion of the upward travel of said angular lever, and to swing laterally above said plate when the free end of said canting-arm passes said plate, with means for swinging said canting-arm about its pivot, a loading-arm provided with a vertically-movable pivot, and means for swinging said arm about its pivot, substantially as described.

41. In an apparatus for loading and turning logs on sawmill-carriages, the combination with a frame supporting the sawmill-carriage, and a plate fast to said frame, of a canting-arm, an angular lever provided with a long upper and a short lower leg and a vertically-movable pivot, the upper leg being pivotally connected to said canting-arm and forming the pivot thereof, of means for exerting an upward pressure on the short lower leg of said angular lever, causing said canting-arm to bear against said plate during a portion of the upward travel of said angular lever, and to swing rapidly laterally above said plate when the free end of said canting-arm passes said plate, and means for swinging said canting-arm about its pivot, a loading-arm provided with a vertically-movable pivot, and means for swinging said arm about said pivot, substantially as described.

42. In an apparatus for loading and turning logs on sawmill-carriages, the combination with a canting-arm, of an angular lever provided with one long and one short leg, and a vertically-movable pivot, the long leg being pivotally connected to said canting-arm, of means operating on the short leg of said angular lever for raising the pivot thereof vertically, and for swinging said angular lever about said pivot, and means for checking the motion of said angular lever about its pivot until said canting-arm has reached a predetermined height, a loading-arm provided with a vertically-movable pivot, and means for swinging said arm about its pivot, substantially as described.

43. In an apparatus for loading logs on sawmill-carriages, the combination with a loading-arm and a separate canting-arm, of a support pivotally connected to said loading-arm and forming the pivot thereof, and an independent support pivotally connected to said canting-arm and forming the pivot thereof, a stationary cylinder with piston-rod and connections for raising and lowering both of said supports, and means for swinging both of said arms about their pivots, substantially as described.

44. In an apparatus for loading logs on sawmill-carriages, the combination with a loading-arm, and a separate canting-arm, of a support pivotally connected to said loading-arm and forming the pivot thereof, and an independent support pivotally connected to said canting-arm and forming the pivot thereof, a stationary cylinder with piston-rod and connections for raising and lowering both of said supports, and a second cylinder with piston-rod and connections for swinging both of said arms about their pivots, substantially as described.

45. In an apparatus for loading and turning logs on sawmill-carriages, the combination with a V-shaped plate, of a support pivotally connected to said plate at or near the apex thereof, a bent canting-arm, and a support vertically connected thereto and forming the pivot thereof, a cylinder with piston-rod and connections adapted to raise and lower both of said supports, and a second cylinder with piston-rod and connections adapted to swing both said plate and said canting-arm about their pivots, substantially as described.

46. In an apparatus for loading logs on sawmill-carriages, the combination with a loading-arm, of an approximately vertical bar or bars forming a support pivotally connected to said loading-arm and forming the pivot thereof, a radius-bar pivotally connected to said supporting bar or bars and holding the same in an approximately vertical position, a canting-arm with a vertically-movable support forming a pivot therefor, a stationary cylinder with piston-rod and connections for raising and lowering both of said supports, and means for swinging both of said arms about their pivots, substantially as described.

47. In an apparatus for loading logs on sawmill-carriages, the combination with a loading-arm, of an approximately vertical bar or bars forming a support pivotally connected to said loading-arm and forming the pivot thereof, a radius-bar pivotally connected to said supporting bar or bars and holding the same in an approximately vertical position, a canting-arm with a vertically-movable support forming a pivot therefor, a stationary cylinder with piston-rod and connections for raising and lowering both of said supports, and a second cylinder with piston-rod and connections for swinging both of said arms about their pivots, substantially as described.

48. In a log loading and turning apparatus, the combination with a pivoted loading-arm and a pivoted canting-arm, of two stationary cylinders, with means operated by one of the said cylinders for raising or lowering the pivots of both of said arms, and means operated by the other cylinder for swinging both of said arms about their pivots, substantially as described.

49. In a log loading and turning apparatus, the combination with a pivoted loading-arm and a pivoted canting-arm, of a reciprocating part and means operated thereby for raising or lowering the pivots of both arms, and a second reciprocating part and means operated thereby for swinging both of said arms about their pivots, substantially as described.

50. In a log loading and turning apparatus, the combination with a pivoted loading-arm and a plurality of pivoted canting-arms, of a reciprocating part and means operated thereby for raising or lowering the pivots of all of said arms, and a second reciprocating part and means operated thereby for swinging all of said arms about their pivots, substantially as described.

51. In an apparatus for loading and turning logs on sawmill-carriages, the combination of the loading-arm F, the canting-arms M, the vertical bars H, the side bars E, the bent bars P, the radius-bar H', the rope with weight K³, the guide-rod U, the steam-cylinders C and D, with their valves Q and Q', the operating hand-rod T, with its pivot, crank-arms and connecting-rods in pivots, all connected and operating together, as and for the purposes described.

In testimony whereof I affix my signature in presence of two witnesses.

PETER McNERNEY.

Witnesses:
AMOS HOLGATE,
HATTIE E. TAYLOR.